3,520,216
COPYING LATHE
Jules Louis Jeanneret, 13–21 Rue Henri Gelin,
79 Niort, France
Filed July 8, 1968, Ser. No. 743,250
Claims priority, application France, July 12, 1967,
114,094
Int. Cl. B23b 3/28
U.S. Cl. 82—14                             11 Claims

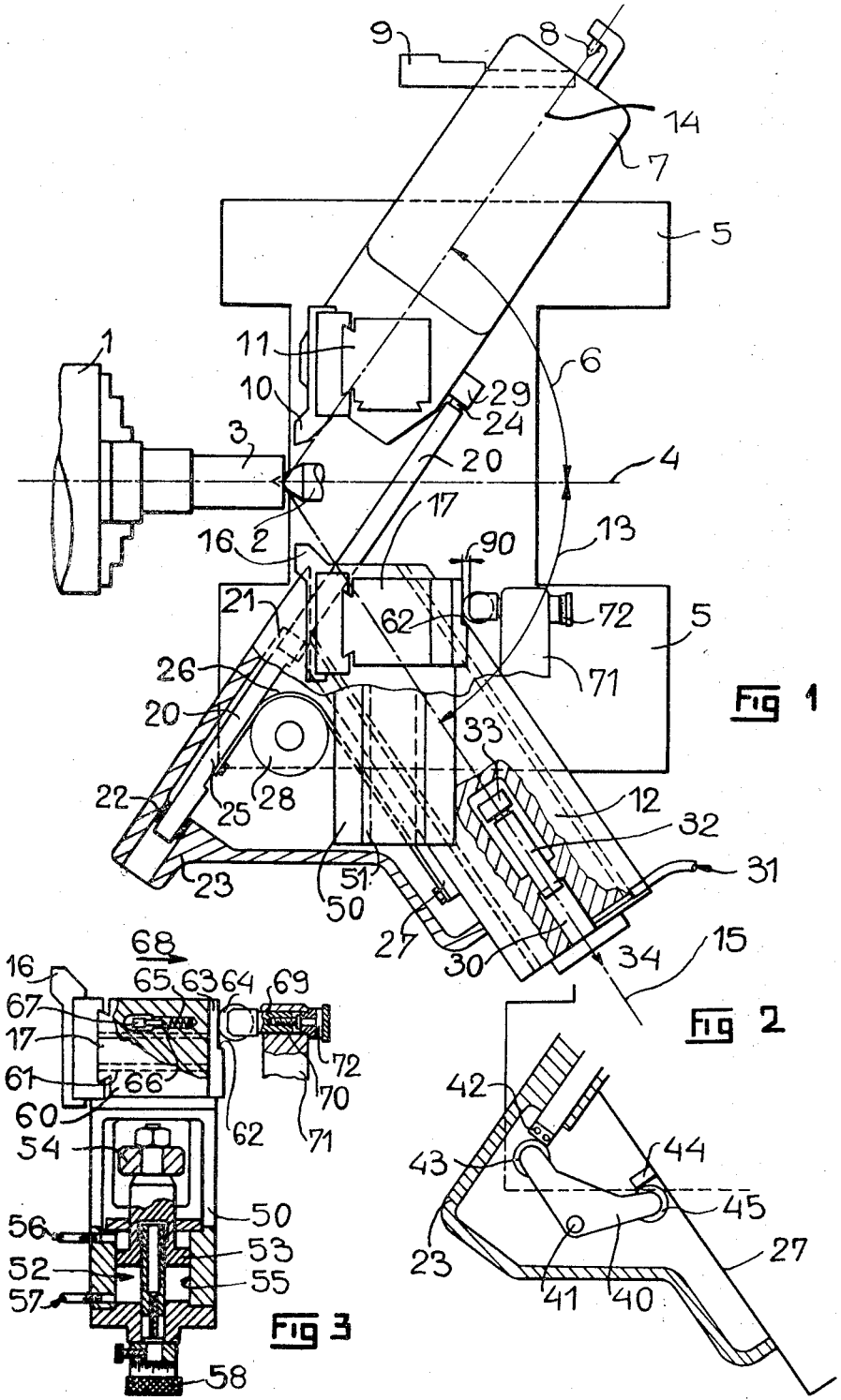

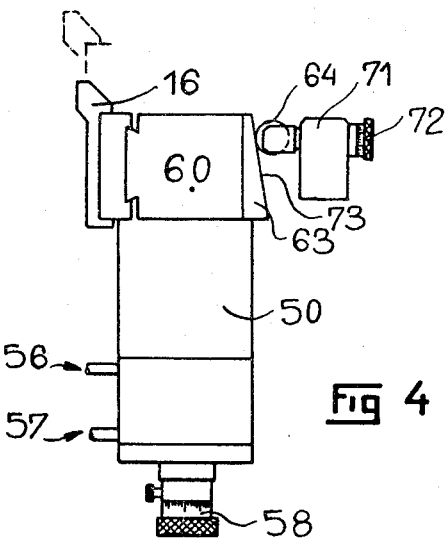
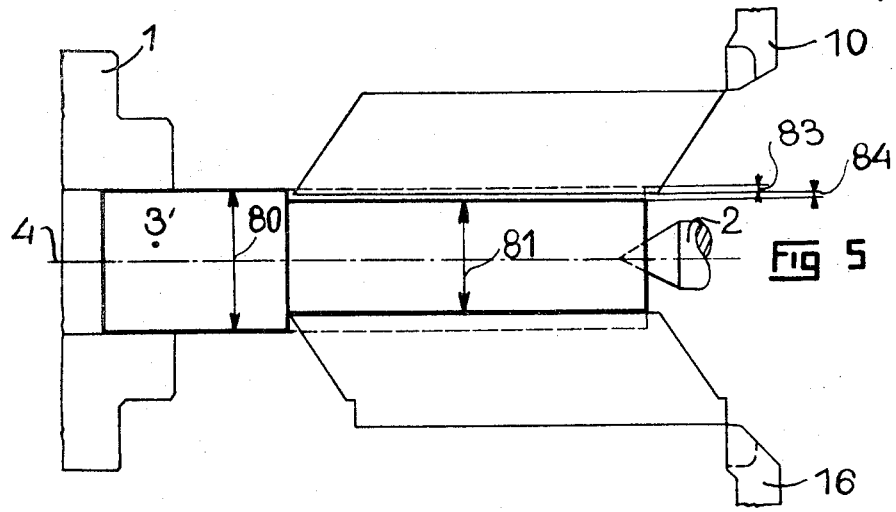

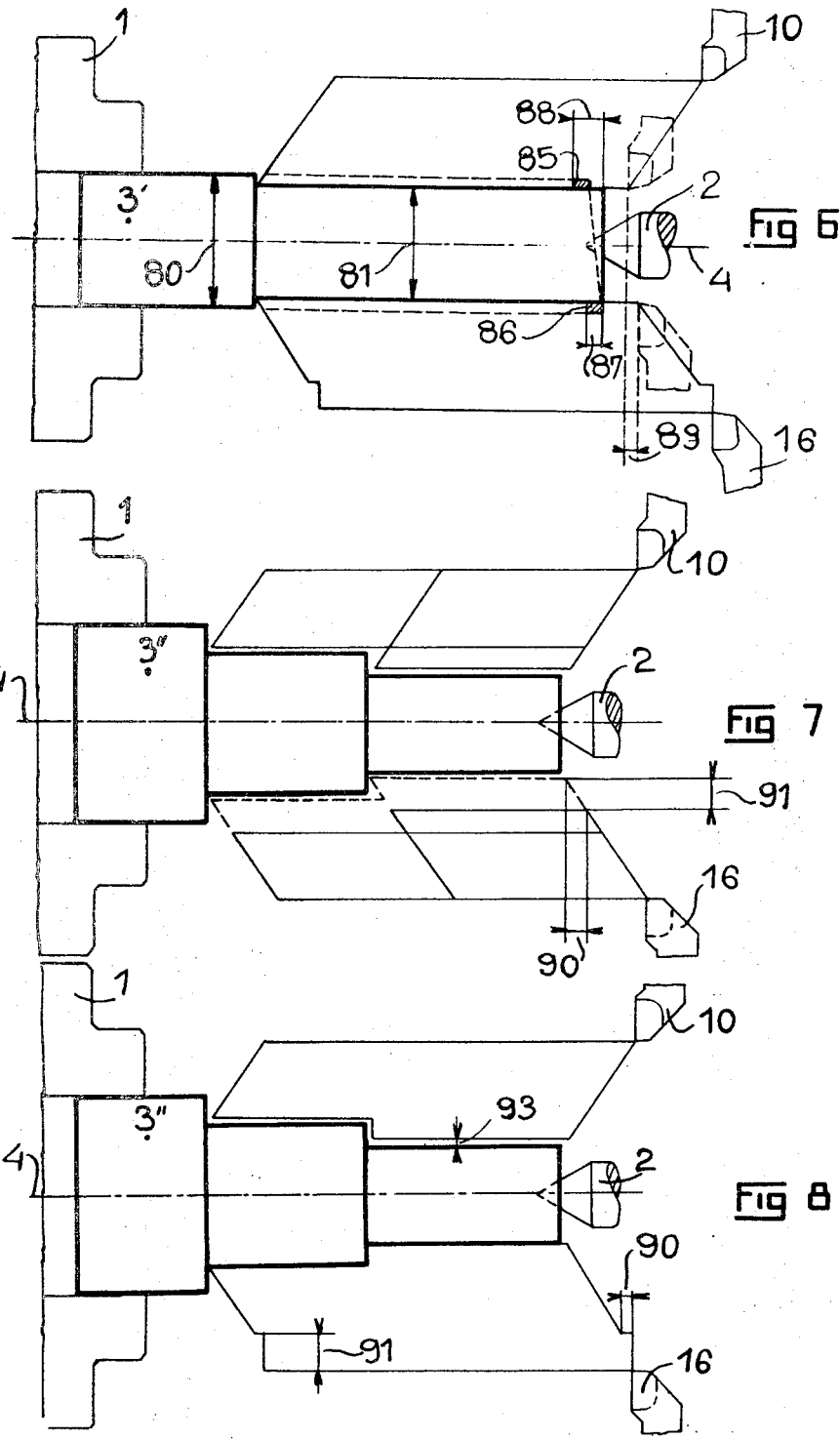

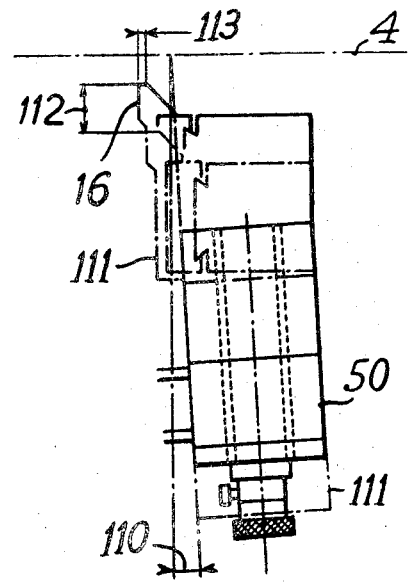
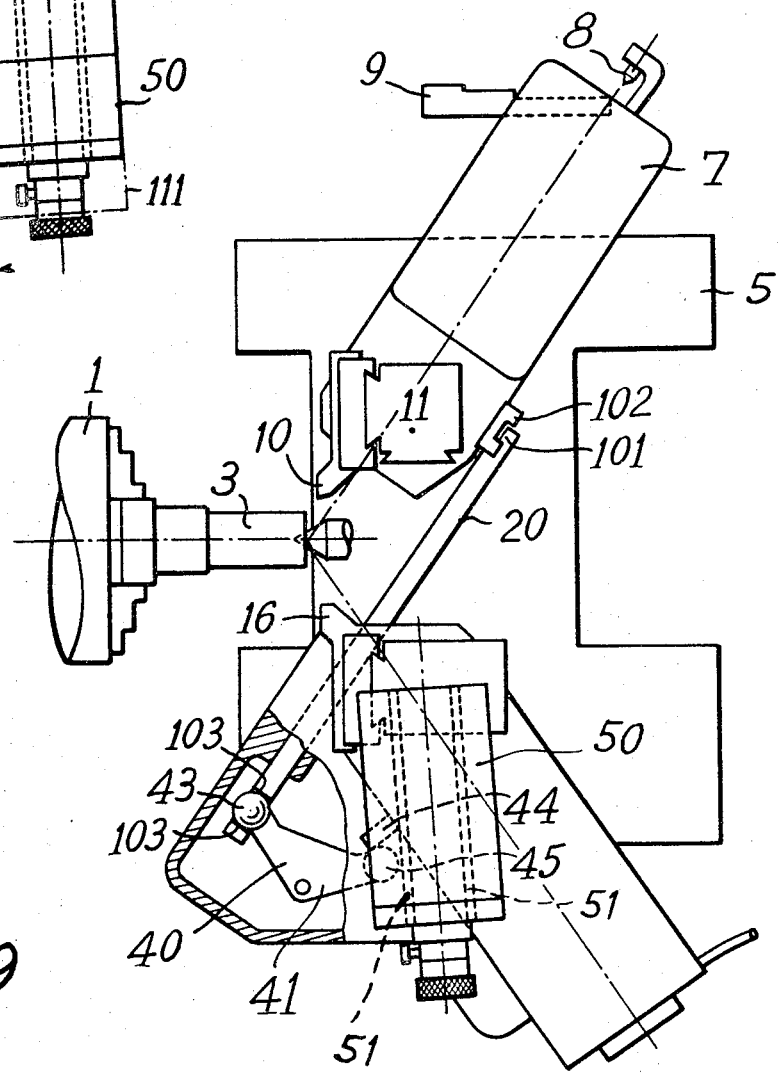

ABSTRACT OF THE DISCLOSURE

Copying lathe carrying two tool carrying slides capable of being simultaneously or selectively operated for the copying of a contour in a mass-production operation. The selective or simultaneous operation of the slides being performed by a transmission means connecting the slides and a releasing means for releasing one of the slides from its working position.

---

The present invention concerns lathes and more particularly lathes having a copying device which follows the contour of a templet or pattern-piece and which are commanded in automatic cycles.

Standard copying lathes are well known and usually comprise a carriage slidably movable parallel to the axis of the piece to be machined on which is mounted a copying slide movably mounted transversely to the axis of the workpiece and which is driven by the means of appropriate feed means. This copying slide carries a cutting tool and a feeler means cooperating with a contour means, such as a pattern-piece, a templet or a drum, which determines the contour to be machined on the workpiece and which acts on the control means for the slide to regulate the distance of the tool from the axis of the workpiece, at each moment.

In order to increase the efficiency of such machines, it has already been anticipated to provide copying lathes with two transverse slides. In certain of these machines, the slides work simultaneously on the workpiece, therefore allowing the speed of execution to be increased and to eliminate deflexions of the workpiece under the action of the cutting operation. These simultaneous workings compensate each other if the tools are diametrically opposed. The slides are controlled from two feeler means or from the same feeler in accordance with different usages, but, in the latter case the slides cannot work in an alternative fashion. Other lathes, in which the slides are controlled by the same feeler are known, in which these slides may work alternatively. But, in this case these alternatively moving slides are used to machine distinct portions of the workpiece and necessitate the use of special copying contours, different from that of the contour of the final piece which it is desired to obtain.

The present invention has for an object a lathe equipped with an improved copying device which gives the lathe an increased capacity for production while at the same time increasing its flexibility and conserving its accuracy. Notably, the improved copying lathe comprises at least two slides which may be used to work on the piece simultaneously or selectively for a copying operation and which automatically allows the selection of the slides for alternative machining operation.

The invention also has for an object a copying lathe which is simple to manufacture and which functions accurately.

In order to obtain the above-mentioned results, the invention comprises an improved copying lathe having a transversely moving slide carrying a tool holder, called the driving slide, movably mounted on a first slide bar inclined to the axis of a piece to be machined and provided with a feeler means cooperating with a contour to be copied, characterized in that a second slide, called the driven slide, is movably mounted on a second slide bar rigid with the first slide bar in the longitudinal direction, and is inclined at the same angle as that of the driving slide to the axis of the workpiece. This driven slide is connected with the driving slide by a transmission means which imposes transverse displacements to this driven slide which are of the same amplitude and in the same direction, toward the axis of the workpiece, as those of the driving slide. The copying equipment thus formed comprises a control device for the release of one of the tools from its operating position.

In practice, it is convenient to arrange the two slides on the same carriage, mounted on the bed of a lathe, and disposed on both sides of the axis of the workpiece, in such a manner that the centre lines of the cutting tools are approximately symmetrical with respect to the axis of the workpiece.

Of course, it is possible to place the two slides so that they are movable in planes which follow the cutting surface of the piece to be machined. The cutting tools are then symmetrical, not with respect to the axis of the workpiece, but with respect to a bisecting plane passing through the axis of this workpiece. This arrangement, set forth above, presents the following advantages: The elimination of the deflexion of long and thin workpieces under the action of the cutting tool, simplicity in manufacturing, and the ability to make the lathe of smaller size. This arrangement does not impede the accessibility of the workpiece and leaves the space necessary for other apparatus which may be mounted on the lathe.

Thus, the two slides are longitudinally rigid, and a single transmission means, of which some examples will be given below, serves to transversely displace both slides, in such a manner that the tools of each slide are mutually brought together or moved away from each other with movements of equal amplitude and in the same direction toward the axis of the piece to be machined.

The driving slide is a copying slide, i.e., it comprises a sensing means for controlling the transverse displacements of this slide by its contact with a control contour or any other means, such as a drum.

The movements of this slide are produced by a motor means, in general hydraulic, controlled by the feeler means, by the intermediary of the transmission, this movement of the driving copying slide produces a symmetrical movement in the driven slide.

If the cutting tools are fixed on the two slides in positions which are symmetrical with respect to the axis of the piece to be machined, it is clear that during the course of a copying machining cycle, the two tools will work simultaneously on the workpiece following two diametrically opposed lines generated by the workpiece. These two generated lines have identical contours, since the movements of the two tools are controlled from the same control means: feeler means and contour to be copied.

Inversely, if the tools occupy unsymmetrical positions and are offset mutually in the radial sense, with respect to their symmetrical position, at a distance which is greater than the thickness of one cutting operation, the tools may work separately. One of the tools may make a cut, while the other is provided with an identical movement, but, without entering into contact with the piece to be machined. Furthermore, no matter what form the two tools which do the work may have, each one of these tools performs work on the same contour on the same workpiece.

This selective utilisation of the two slides is made possible by the control means for disengaging or releasing one of the tools out of its operating position, i.e., a position in which it effectively works on the workpiece when the feeler means cooperates with the contour to be copied under the effect of the longitudinal feed of a carriage. Such an arrangement is easily adapted so as to be automatically controlled by means which allows the alternative machining of a workpiece with a first slide, and then with a second slide.

Thus, the two driving and driven slides may be simultaneously or selectively used, but in each of these cases, these slides are controlled by a means, which is separate and unique, the contour to be copied.

The advantages of this arrangement are numerous: The use of the present equipment for the simultaneous machining by two tools in the mass-production of ordinary pieces allows a speed which is approximately double that which would ordinarily be acceptable with a standard lathe having one tool to be obtained. This follows from the fact that it is possible to, either divide the thickness of the cut to be made and increase the speed of the advancing movement, or, for the same feeding speed, make a cutting operation twice during each rotation of the lathe of which the thickness would correspond to the feed on a standard lathe.

This gain in speed may be obtained without using a second copying assembly, which second assembly would have to be complex and expensive, if the desired accuracy is to be obtained, but, simply by the addition of a second non-motorised slide, which is an exact copy of the first slide and which carries out a single role.

But, the improvement in accordance with the invention also produces a lathe having a much larger range of utilisation.

It is thus, that selective working operations with two tools on a lathe equipped in accordance with this invention allows the simplification of certain operations, notably, when certain operations must be executed with different tools.

Thus, for example, roughing out operations on a workpiece may be performed by one of the tools while the other tool moves in an empty space, then the finishing operations may be performed by the other tool. The selection of these tools being commanded by the automatic cycling means of the lathe.

A lathe in accordance with the invention comprises a tool carrying transversely moving slide, called the driving slide, movably mounted on a first slide bar inclined to the axis of a piece to be machined, and carrying a feeler means cooperating with a contour to be copied, characterized in that a second slide, called the driven slide, is movably mounted on a second slide bar rigid with the first slide bar in the longitudinal direction and inclined at the same angle as the first slide to the axis of the workpiece, the said driven slide being connected to the driving slide by a transmission which transversely moves the driven slide the same distance and in the same direction toward the axis of the workpiece as that of the driving slide, the copying equipment thus formed including a releasing control means for releasing one of the slides from its working position.

It is understood after the above set forth remarks that the lathe which has been defined allows the proposed objectives to be obtained.

In order to better understand the invention under all of its aspects, the following description gives a mode of realisation of the invention and several modifications thereof made in reference with the accompanying drawings in which:

FIG. 1 shows a plan view with partial cross-sections of a copying lathe in accordance with the invention;

FIG. 2 is a detailed view of a modification of the transmission between the two slides;

FIG. 3 is a view showing, in partial cross-sections, one arrangement of the axial and radial releasing control means and one of the tools;

FIG. 4 shows, in the same conditions, a modification of the arrangement shown in FIG. 3;

FIGS. 5 and 6 schematically show the movements of the two tools, in accordance with two modifications, of a first mode of operation;

FIGS. 7 and 8 illustrate two steps of the movements of the two tools in accordance with a second mode of operation;

FIGS. 9 and 10 illustrate a modification of the arrangement for the control of the disengagement of one of the tools.

There is shown in FIG. 1, a holding mandrel 1 such as the face plate of a lathe, and a lathe tail-stock 2, of which the frame has not been shown. A workpiece to be machined 3 having an axis 4 is shown as being fixed between the holding mandrel 1 and a centre of the tail-stock 2. Above this workpiece 3 is mounted a carriage 5 shown schematically on FIG. 1 and which is movably mounted on the bed of the lathe with a standard longitudinal feeding means connected to the automatic cycling means of the lathe.

On this carriage 5 is mounted a copying slide 7 transversely movable on a slide bar (not shown) inclined in a direction so as to form an angle 6 with the axis 4.

A copying feeler means 8 is mounted on the rear of this slide, and cooperates with a pattern-piece or templet 9 rigid with the frame of the machine, and defining the contour which is to be copied. This feeler 8 controls the slide 7 through the instrumentality of an hydraulic jack, in a fashion which is well known in the field of copying lathes.

Finally, this slide 7 carries at its front a cutting tool 10 fixed on a tool holder 11.

A second slide 12 is mounted on the same carriage 5, and is transversely movable on a slide (not shown) inclined in a direction forming an angle 13, equal to the angle 6, with the axis 4. The longitudinal symmetrical planes 14 and 15 of the two slides intersect on the axis 4. The slide 12 does not carry a motor means. This slide is equipped with a tool 16 fixed on a tool holder 17 in a position which is approximately symmetrical to that of the tool 10 with respect to the axis 4, the two tools 10 and 16 are thus contained in the same plane which is diametrical to the workpiece 3, whatever may be the position of the two slides 7 and 12 and of the carriage 5.

The two slides 7 and 12 are rigid in their movements in the longitudinal direction when they are mounted on the same carriage. These slides are connected in their transverse movements by a mechanism which may be divided, on the one hand, into an arrangement transmitting a feeding movement of the slide 7 to the slide 12, to provide the latter with a feeding movement having an identical amplitude, and, on the other hand, into a separate arrangement permanently acting on the slide 12 in opposition to this movement.

The first of these arrangements is formed by a shaft 20 parallel to the axis 14 of the slide 7 and sliding in two guides 21 and 22 of a box 23, rigid with the carriage 5, on the side of the slide 12. This shaft passes under the axis 4 and under the front end of the slide 12.

The front end 25 of the shaft 20 is connected, by a steel band 26, to the side face 27 of the slide 12 on which this band is fixed by its other end. Between these two shafts, the band passes over a change of direction pulley 28 located in the angle formed by the front end 25 of the shaft 20 and the side face 27 of the slide. The axis of this pulley 28 is fixed to the carriage. The rear end 24 of the shaft 20 is applied against the front face of the stop 29 fixed on the side walls of the slide 7, in such a manner that a feeding movement of this slide 7 causes the shaft 20 to slide toward the front in the guides 21 and 22 and the pulling of the band 26 attached to the front end 25 of this shaft. This pull is applied to the slide 12 after it changes its direction when going around the pulley 28. The movements of the slide 7 are then identically transmitted to the slide 12, provided that the steel band 26 remains subjected to an approximately constant tension.

To this effect, a separate arrangement is provided, permanently tending to move the slide 12 backwards, and which consists of a simple effect jack 30 receiving a constant pressure hydraulic fluid by means of a conduit 31. This fluid tends to push a piston 32 applied against a block 33 rigid with the box 23 toward the front of the slide 12. The reaction of this applied force acts on the slide itself, toward the rear of the latter in the direction of the arrow 34. This reaction applies a constant tension to the band 26 and by its instrumentality, constantly applies the rear end 24 of the shaft 20 against the front of the stop 29 rigid with the slide 7.

Due to this arrangement, a withdrawing or backward movement of the slide 7 is followed by a withdrawing movement, having an identical amplitude, of the slide 12.

FIG. 2 shows a modification of the angle changing mechanism attached to the end of the shaft 20 and which applies transverse movements to the slide 12 in a direction opposite and of the same amplitude as that of the slide 7.

In this modification, the band 26 and the pulley 28 are replaced by a rocker-arm 40 held in the box 23, articulated on an axis 41 fixed in the box 23 and having two identical arms. One of the arms acts on the end plate 42 of the front end 25 of the shaft 20, by the instrumentality of a roller 43, and the other arm of this rocker-arm 40 is pressed against the rear face of a lug 44, fixed on the side wall 27 of the slide 12, through the instrumentality of an identical roller 45.

The reaction of the jack 30 on the slide 12, and thus on the lug 44 constantly tends to pivot the rocker-arm 40 around its axis 41 and maintains its roller 43 against the end plate 42 of the shaft 20.

In FIG. 9, there is shown a small modification of this latter arrangement, in which the end of the shaft 20, applied against the slide 7, is rigid with this latter through the instrumentality of a raised portion 101 holding a finger 102 of the slide 7. At its other end, the shaft 20 is provided with a large transverse slot 103 in which a ball 43 of the rocker-arm 40 is held. Thus, this rocker-arm is rigid with the feeding movements and with the withdrawing movements of the shaft 20.

In all cases, the shaft 20 may be easily removed from the slide 7. The driven slide 12 is removable and may be taken away with its transmission, in case of need, and may be easily remounted.

FIG. 3 shows an arrangement for the control of the release, either in the axial or transverse directions, of the tool 16 carried by the slide 12. This tool 16 is mounted in the tool holder 17 at the front of the slide 12 on a carriage 50, movable between two positions on this latter, in a radial direction on the slide bars 51. The movement of this carriage 50 is brought about by a double acting jack 52, controlled by an electrodistributor connected with synchronisation elements (not shown) of the automatic cycle control means of the copying lathe. These synchronisation elements are made in any well known manner now in use with this type of machine.

The jack 52 is composed of a double faced piston 53 fixed to a bridge 54 rigid with the slide 12 and a cylinder 54 mounted on the carriage 50. A first fluid conduit 56 allows fluid under pressure coming from the electrodistributor to act on one face of the piston 53 to thereby cause a feeding movement of the carriage 50 on the slide 12 toward the axis 4, and another conduit 57 to cause the withdrawal movement of this carriage. The jack 52 therefore allows disengagement movements and transverse engagement of the tool with respect to the workpiece 3.

A micrometric divider 58 placed at the end of the carriage 50, along the axis of the jack 52, allows the transverse position of the tool 16 to be precisely regulated for a cutting operation.

For longitudinal release of the tool 16, the tool holder 17 is constituted by a tool slide 60 movably mounted on longitudinal slide bars 61 of the carriage 50. This tool slide has a small movement, the value of which is determined by the height of an offset portion 62 formed on an end plate 63 opposite to the tool 16 and elastically applied against a roller 64 fixed to the slide 12.

This elastic application is brought about by a spring 65 mounted in a slot 66 formed in the tool slide 60 and applied against a piston 67 fixed to the carriage 50, acting to constantly bias the tool slide 60 in the direction of the arrow 68.

The roller 64 is mounted at the end of a piston 69, slidably mounted in a bore 70 of a bridge 71 fixed to the slide 12. The micrometric movements of the piston 69 are controlled by a divider 72.

This arrangement functions as follows:

At the time of the transverse displacement of the carriage 50, carried out by the double action hydraulic jack 52, the plate 63 of the tool slide 60 moves over the roller 64 against which it is constantly applied. When the roller comes into contact with the stepped portion 62, the tool 16 is abruptly displaced a distance equal to the height of this stepped portion, thus giving the tool 16 two longitudinal positions, each corresponding to the opposite end positions of the transverse movement of the carriage 50. The divider 72 allows the longitudinal position of the tool 16, to be regulated with precision at the beginning of a cutting operation.

The mechanism which has just been described, allows the simultaneous transverse and longitudinal release of the tool 16 controlled by the automatic cycle of a lathe.

FIG. 4 shows a modification of the arrangement for the longitudinal displacement described above in connection with FIG. 3. In this modification, the end plate 63 contains a contour 73 inclined to the axis 4, in place of the stepped portion 62. This contour 73 allows much larger longitudinal displacements to be obtained.

According to another modification of the arrangement of the releasing control means for the tool 16, illustrated in FIGS. 9 and 10, the contour is directly mounted on the carriage 50, the slide bars 51 on which the carriage 50 moves being inclined at a small angle 110 (FIG. 10) to a line perpendicular to the axis 4. The carriage is thus moved in a direction which is slightly oblique to the axis 4 of the workpiece.

In FIG. 10, the position of the carriage 50, when the tool 16 is disengaged from its working position, is shown by the dotted line 111. The working position of the carriage 50 and the tool 16 is shown in solid lines. Between these two positions, the tool 16 undergoes a translational displacement in the radial direction shown at 112 and a much smaller longitudinal displacement 113. Thus, by the simple translation of the carriage 50, on its slide bars 51, the radial and longitudinal withdrawal of the tool, with respect to its operating position, is obtained.

The lathe which has just been described, may be used for two types of essential applications: It may be used for the reproduction or copying of pieces with the simultaneous or selective machining by two tools. The considerable increase in the possibilities of use of the lathe which thus results, constitutes a fundamental aspect of the invention.

For the use of a lathe with the first of these two types of application, the tools 10 and 16 are mounted on the slides 7 and 12 in such a manner that the cutting edges of their tools are symmetrical with respect to the axis 4 of the workpiece 3. The transverse feeding of the slide 7 controlled by the feeder 8 and the contour guide 9, causes a symmetrical feeding movement of the slide 12 and the reproduction of the contour is simultaneously executed by the two tools 10 and 16 when the carriage is provided with a longitudinal feeding movement. It should be noted that under these conditions, if the thickness of the cuts to be made by the two tools are approximately equal, the radial pressures exerted by the tools 10 and 16 on the workpiece cancel each other out. This eliminates the deformation and bending of the portion being machined. This last advantage is especially valuable when the length of the portion being machined is large with respect to the diameter of the workpiece.

The position of the cutting tool 10 is regulated with the help of an ordinarily graduated micrometric control means for the slides 7 of the lathe. The position of the tool 16 may be axially and radially adjusted with the help of dividers 58 and 72, which allow the cutting edge of this tool 16 to be slightly displaced with respect to the accurately symmetrical position of the cutting edge of the tool 10. This displacement does not exceed more than the thickness of one cutting operation, consistent with the feeding speed of the longitudinal movement of the carriage chosen, in a radial direction. This condition must be met in order that the simultaneous machining with the two tools may take place.

When simultaneous copying with two tools is executed on a piece 3' comprising two portions having diameters 80 and 81, respectively, the thickness of the material to be taken off during one cutting operation may be divided, corresponding to the half-difference of these two diameters in two different manners.

The movement of the tools, in the first modification, is schematically shown in FIG. 5: The half-difference of the diameters 80 and 81 is divided, in the radial direction, into two equal thicknesses 83 and 84. The first thickness 83 being taken off by the tool 10 and the second thickness 84 by the tool 16. The two tools rest in the same plane perpendicular to the axis 4 and move radially a distance which is equal to the thickness of one cutting.

According to another modification, the thickness of the cut to be made may be axially divided. The diagram of the movements of the two tools 10 and 16 in this case, is shown on FIG. 6. The two tools each take off a cutting 85 and 86, having a radial thickness equal to the half-difference between the diameters 80 and 81, but, whose length 87 parallel to the axis 4 is only a half-length 89 of a longitudinal feeding step 88, i.e., a half-length of the longitudinal feeding movement for one revolution of the workpiece 3'. In this manner, the distances to the axis of the two tools 10 and 16 are equal, but their cutting edges are axially displaced by a half-length 89 of a longitudinal feeding step 88.

FIG. 6 shows, in dotted lines, the state of the workpiece 3' after one machining revolution of the latter, and the cross hatched sections 85 and 86 represent the thicknesses of the cuttings which will be respectively made by the tools 10 and 16 during the course of the next longitudinal feeding operation.

It is noted that the thickness of the cutting to be made during the course of one turning operation is equally divided between the two tools, thus showing that the radial pressures caused by the two cutting tools are approximately equal and tend to cancel each other out.

The second use of the lathe, which consists in the reproduction of a contour with selective machining by one or the other of the tools 10 and 16, is illustrated by the FIGS. 7 and 8, which show the diagram of the displacements of the two tools for the successive machining operations, i.e., a roughing out operation, and then a finishing operation for the piece 3''.

In the example chosen, the tool 10 is used to perform the roughing out operation of the workpiece 3'' (see FIG. 7), in two traversing operations, by the means of a known copying device, such as a pattern-piece, a template or a copying drum. During this time, the tool 10 follows paths which are superposable with those of the tool 10, but without touching the piece 3'' due to a longitudinal displacement 90 corresponding to the height of the stepped portion 62 and to a transverse displacement 91 corresponding to the course of travel of the jack 52. These displacements are brought about with respect to the normal cutting position of the tool, the path of which is shown in dotted lines. These displacements are obtained by actuating the axial and radial disengagement means of the tool which has been set forth above.

FIG. 8 shows the path of the two tools during the finishing operation. In this case, the tool 16 is engaged in its cutting or working position both transversely and longitudinally by the action of the jack 52 controlled by the automatic cycling means of the lathe, and the original micrometric adjustment of the position of the tool 16 is such that the tool 16 comes before the position of the tool 10 both axially and longitudinally. Thus, in its turn, the tool 10 follows the movement of the tool 16, without entering into contact with the piece 3'', because the tool 10 is withdrawn from the workpiece 3'', a distance 93 corresponding to the thickness of material taken off during the course of the finishing operation.

There is an important interest in the machining of a workpiece by roughing out operations and finishing operations with different tools. The workpiece to be used always contains an eccentric or deformed exterior surface and is covered with scale. These two defects cause a rapid wearing of the cutting edge of the tool which makes the first cutting operation. This tool will then be no longer in a state to carry out the finishing operations for which the longitudinal feed of the carriage is diminished and the speed of the cut is increased. Therefore, a tool especially made for the finishing operation of a workpiece is of great interest.

In a general fashion, it is seen that this possibility of selective utilisation of the two tools may be profitably used each time that there is a need to effectuate a copying of the same contour with two different tools. The present invention helps to eliminate the loss of time involved in the changing of a tool. The changing from a position of rest to a working position, from one tool to the other and the eventual modification of the longitudinal feeding movement of the carriage during the course of this changing of the tool may be controlled, as has been set forth above, by the synchronisation elements of the automatic control means for the lathe.

It is obvious that this improved lathe may be used for many other applications, in accordance with this invention and that the two modes of operation described above are not limiting. All the uses which can profit from the above set forth possibilities and the flexibility of the lathe of the present invention are, of course, considered to fall within the scope of the present invention.

What is claimed is:

1. Copying lathe comprising a first slide bar; a transversely moving driving slide movably mounted on the first slide bar inclined to the axis of a piece to be machined; said transversely moving slide carrying a feeler means cooperating with a contour to be copied; a second slide bar; a driven slide movably mounted on the second slide bar which is connected to the first slide bar in the longitudinal direction and inclined at the same angle as the first slide to the axis of the workpiece; a transmission means connecting said driven slide to the driving slide; said transmission means transversely moving the driven slide the same distance and in the same direction toward the axis of the workpiece as that of the driving slide; the copying equipment thus formed including a releasing control means for releasing one of the slides from its working position.

2. Lathe in accordance with claim 1 wherein the two slides carry cutting tools and are mounted on a single carriage, the cutting edges of the cutting tools rest in the same diametrical plane of the workpiece.

3. Lathe in accordance with claim 1 wherein the releasing control means of one of the slides comprises a withdrawal mechanism both for the radial and longitudinal displacement of this slide with respect to its working position.

4. Lathe in accordance with claim 1 wherein the releasing control means of the slide is a two position tool carrying carriage movable on a slide bar carried by one of the slides.

5. Lathe in accordance with claim 4 wherein the two position tool carrying carriage is driven by a double acting jack connected to an automatic cycle control means of the lathe.

6. Lathe in accordance with claim 5 wherein the two position tool carrying carriage is equipped with at least one micrometric screw for regulating the position of the slide.

7. Lathe in accordance with claim 4 wherein the slide for the two position tool carrying carriage is inclined a few degrees to the axis of the workpiece and a tool is directly mounted on this carriage.

8. Lathe in accordance with claim 6 wherein the slide bar of the two position tool carrying carriage is perpendicular to the axis of the workpiece and a tool is mounted on a tool slide movable in a direction parallel to the axis of the workpiece and which is biased by one of its contoured faces against a roller capable of rolling on this face under the action of the movement of the two position carriage.

9. Lathe in accordance with claim 1 wherein the transmission between the driving slide and the driven slide comprises a shaft mounted so as to slide parallel to the driving slide against which it is applied, and forms an extension of this slide toward its front portion; the other end of said shaft driving the driven slide in one direction, by the instrumentality of a change of angle mechanism; the driven slide being driven in the opposite direction by a separate means.

10. Lathe in accordance with claim 9 wherein the angle changing mechanism is a rocker-arm pivoted on the carriage and which comprises two arms one of which cooperates with an end of the sliding shaft and the other of which cooperates with a lug mounted on the driven slide.

11. Lathe in accordance with claim 9 wherein the angle changing mechanism comprises a band passing over a pulley, the ends of the band being, respectively, fixed to an end of the sliding shaft and to the driven slide.

References Cited

UNITED STATES PATENTS 3,427,907    2/1969    Gajda et al. _____ 82—14

GERALD A. DOST, Primary Examiner